June 23, 1936.   L. ESPENSCHIED   2,045,071

ALTIMETER FOR AIRCRAFT

Filed April 29, 1930

INVENTOR
L. Espenschied
BY
ATTORNEY

Patented June 23, 1936

2,045,071

UNITED STATES PATENT OFFICE 2,045,071

ALTIMETER FOR AIRCRAFT

Lloyd Espenschied, Kew Gardens, N. Y., assignor to American Telephone and Telegraph Company, a corporation of New York Application April 29, 1930, Serial No. 448,409

3 Claims. (Cl. 250—1)

This invention relates to the art of measuring distance by means of electromagnetic waves and specifically to a method and means for determining the altitude of aircraft above the earth.

My method for determining the altitude employs the principle of radiating high frequency waves from the craft downward to the earth's surface, receiving the waves reflected by the earth's surface upward to the craft and determining the time interval between radiation and reception. The distance of the craft above the earth's surface is measured in terms of the time taken by the waves to make the complete circuit from the craft to the earth and back again. My invention resides in a method and means for determining the time taken by the transmitted and reflected waves to complete the circuit between the craft and the earth and back again; which time is determined by the time delay of the returned waves as compared with the outgoing waves. That time delay is measured by beating the received, reflected waves with the waves generated for transmission, whereby a resultant current is set up in an indicating device, which resultant rises and falls in magnitude at a frequency, depending upon the time delay between the waves that are being beaten together.

My invention resides in a method and means by which the altitude of the craft above a reflecting surface may be determined by the time of travel of the electromagnetic waves from the craft to the surface and back again to the craft.

Figure 1:
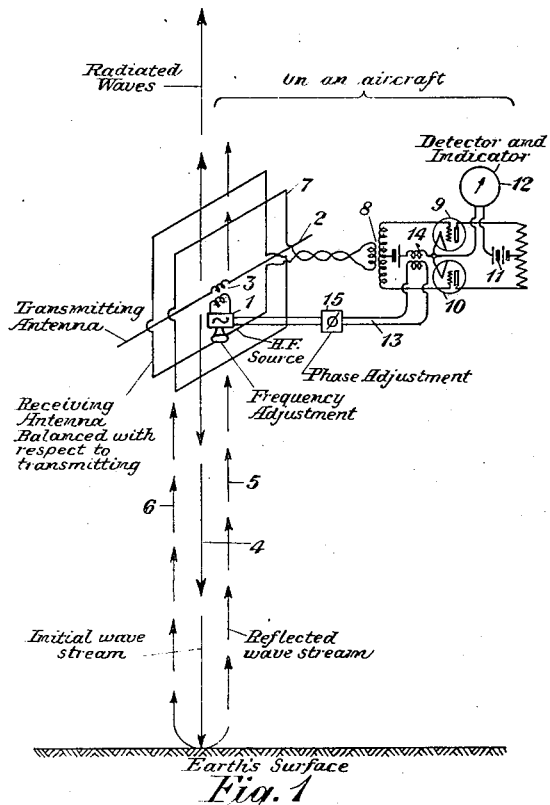
Figure 2:
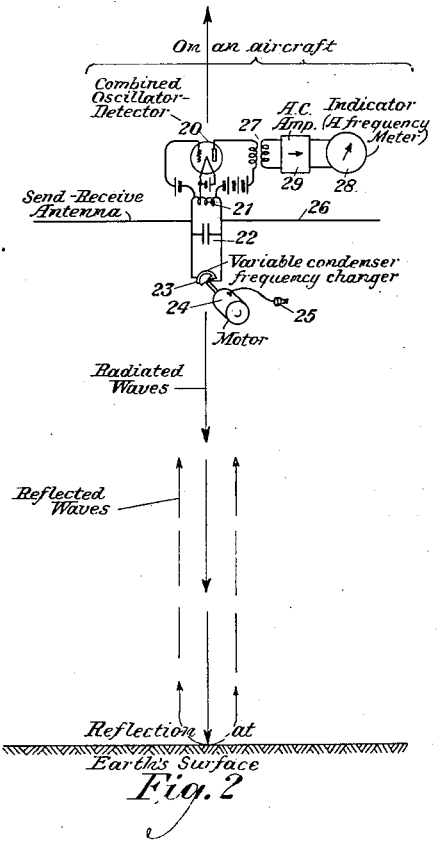
Figure 3:
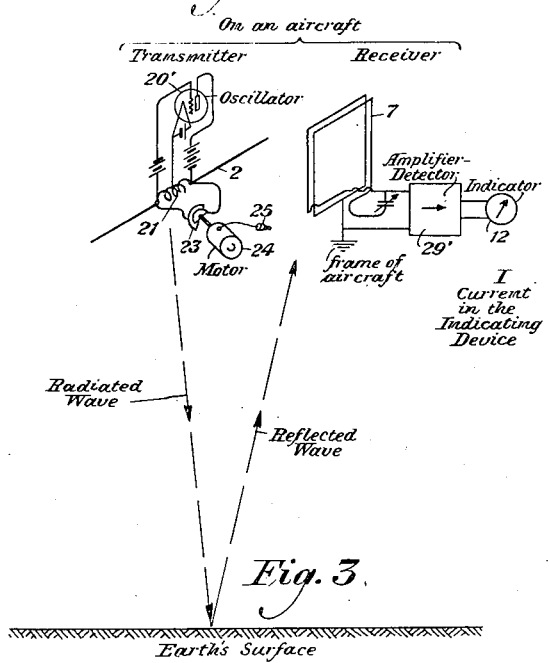
Figure 1A:
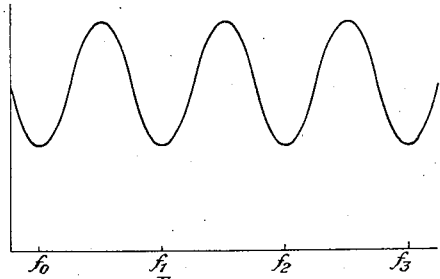

This invention will be fully understood from the following description when read in connection with the attached drawing of which Figure 1 shows schematically one form of embodiment of the invention; Fig. 1a is a graph illustrating the description of the methods underlying my invention; Fig. 2 shows schematically another arrangement of the apparatus differing from that in Fig. 1 in that the transmitted frequency does not remain fixed but varies continuously throughout a predetermined range; and Fig. 3 illustrates a system combining the direct indicating feature of Fig. 2 with the use of separate transmitting and receiving antennae as in Fig. 1.

In Fig. 1, 1 represents a source of high frequency oscillations, for example, 30 megacycles, which source may be any well known type of oscillator having means whereby its frequency may be adjusted at will over a range of about ten per cent. of its normal value. The oscillator 1 is coupled by the coupling transformer 3 with the transmitting antenna 2 illustrated as a Hertz doublet. The oscillations transmitted by the antenna 2 downward over the path 4 will be reflected by the earth's surface, and the reflected waves, indicated by the paths 5 and 6 will be received by the receiving antenna 7 represented by the divided loop which is balanced with respect to the transmitting antenna. The loop is connected with the primary winding of the transformer 8, the secondary of which is connected across the input circuit of the push-pull detector. That detector is of the well known type comprising the balanced tubes 9 and 10 having their grids connected with the secondaries of the transformer 8 and having their plates connected with a common output circuit that includes a source of plate voltage 11 and an indicating instrument 12. The common branch of the input circuit is connected with the source of oscillations 1 by a circuit 13 which is coupled by the transformer 14 with the input circuit. The circuit 13 may, if desired, contain a phase adjustor 15. By means of the circuit 13, a portion of the oscillations generated by the source 1 are fed to the input circuit 14 to homodyne the received, reflected waves that are impressed by the transformer 8 upon the detector. All of the apparatus shown in the figure would be located upon the aircraft.

The manner in which the aforedescribed apparatus operates to determine the altitude of aircraft is as follows: The oscillator 1 is started in operation and waves are projected by the transmitting antenna 2 downward to the earth's surface where they will be reflected, then later received by the loop 7 and impressed upon the input of the push-pull detector. Simultaneously, a portion of the generated oscillations will be fed to the detector directly over the circuit 13. The phase relation in the detector between the reflected wave current and the current taken directly from the local source at any moment depends upon the exact distance between the craft and the earth's surface. As this distance changes upwards, the phase relation between the two currents in the detector changes cyclically and the indication of the meter 12 alternately increases and decreases. Likewise, as the distance between the craft and the earth changes downwardly, the phase relation between the current varies similarly. That relationship is shown graphically in Fig. 1a wherein the ordinates represent the magnitude of the current, that is shown by the indicating device 12, and the abscissae represent frequency. It will be seen from Fig. 1a that, for any fixed distance between the craft and the earth, the variation of the frequency of the transmitted and received waves will cause an increase and decrease of the resultant current shown upon the device 12, the values of which, when plotted, as in Fig. 1a, show a low frequency wave.

In making the measurement, the oscillator 1 is adjusted as to frequency until the indicator 12 shows a minimum value. The frequency of the oscillator that produces such minimum value is then noted. Let it be assumed that that frequency is $f_1$ of Fig. 1a. Then, without changing the altitude of the plane, the frequency of the oscillator 1 is changed until the indicator 12 goes through one cycle of reading and comes back to the next low point adjacent to the low point corresponding to the frequency $f_1$. That low point could be either the one corresponding to $f_0$ or $f_2$. Let it be assumed that the changed frequency is $f_2$. It will therefore be apparent that we have shortened the length of the transmitted wave to such extent that the new wave will travel over the same path and when received will have substantially the same phase relation to its transmitted wave as the original wave of frequency $f_1$ bore to its transmitted wave. That is to say, in the distance from the craft to the earth and back again to the craft, there will be a definite number of oscillations of frequency $f_1$ and, similarly, a definite number of oscillations of frequency $f_2$. This probably will be better understood if we assume certain numerical values to illustrate the operation. If the first frequency setting were an even 30 megacycles (10 meters) and the second setting were 30.3 megacycles (9.9 meters), it is known that it took a change of one part in one hundred to shift by one wave length the number of wave lengths contained in the path of transmission from the craft to earth and back again. The length of the path would accordingly be one hundred wave lengths and since each wave is 10 meters, the total path would be 1000 meters. The distance of the craft above the earth would be one-half of that value, that is, 500 meters. If, in another case, the interval between two consecutive minimum points of the curve of Fig. 1a corresponds to a 5% change in the original frequency, that would be equivalent to a change of one wave length in twenty. If the wave length were 10 meters, the total length of the path traversed by the wave would be 10×20, that is, 200 meters and the actual distance from the craft to the ground would be one-half of that value, that is 100 meters. Hence, the following relationship obtains:

$$\text{Height above earth} = \left\{\begin{matrix}\text{wave length of} \\ \text{transmitting} \\ \text{frequency}\end{matrix}\right\} \div \left\{\begin{matrix}\% \text{ change in} \\ \text{transmitting} \\ \text{frequency}\end{matrix}\right\} \times \frac{1}{2}$$

or:

$$= \frac{3 \times 10^8}{\text{frequency}} \times \frac{\text{frequency}}{\text{change in frequency}} \times \frac{1}{2}$$

or, abbreviating:

$$= \frac{1.5 \times 10^8}{\Delta f}$$

where $\Delta f$=the change in frequency.

The following table gives an idea of the magnitude of the frequencies corresponding to different altitudes:

| Height of aircraft above ground | Frequency interval of "beat" |
|---|---|
| | Cycles |
| 30 meters, or about 100 feet | 5,000,000 |
| 100 meters, or about 300 feet | 1,500,000 |
| 300 meters, or about 1,000 feet | 500,000 |
| 1,000 meters, or about 3,000 feet | 150,000 |
| 3,000 meters, or about 10,000 feet | 50,000 |

The foregoing formula and values of the "frequency interval" of the beats, as shown in the table, are directly applicable to the arrangements shown in Figs. 2 and 3, hereinafter fully described. When a push-pull detector is employed of the type shown in Fig. 1, in which the indicator is connected in the common conductor of the two tubes, the formula and the "frequency interval" of the table must be divided by two in order to represent the true altitude and the "frequency interval", the reason being that with the indicator thus connected the beats occur twice as frequently as they would with the type of detector shown in Figs. 2 and 3, and also twice as frequently as they would if the indicator of Fig. 1 were bridged across the resistance in the output circuit of the detector of Fig. 1. From this table it is seen that the use of very high frequency currents is required in order that the shorter elevations may be detected.

The arrangement shown in Fig. 2 is adapted to give a continuous indication of the distance of the craft above the earth and in that way it differs from the arrangement shown in Fig. 1. In Fig. 2, the tube 20 functions as a combined oscillator and detector, its input and output circuit being coupled by the inductance 21, which inductance forms part of the tuned circuit. That circuit also includes a fixed condenser 22 and a variable condenser 23 which, by virtue of its connection with the shaft of the motor 24 is capable of varying continuously the amount of capacity in the tuned circuit. The motor may be driven by a generator or other source of potential that may be connected with the motor by the lead 25. The tuned circuit is connected with the antenna 26 that is of the same type as the transmitting antenna of Fig. 1. The output circuit of the tube 20 is connected by the transformer 27 with an indicating circuit that includes a frequency meter 28 and one or more stages 29 of alternating current amplification. All of the apparatus shown in the figure would be located in suitable position on the aircraft.

In the operation of the arrangement shown in Fig. 2, the waves of continuously varying frequency are radiated by the antenna 26, which waves, after being reflected by the earth are again received by the said antenna 26. The reflected waves are impressed upon the oscillator-detector 20 and the resultant wave, when amplified by 29, will be impressed upon the frequency meter 28. The amplitude of the resultant current at any instant will, of course, depend upon the instantaneous phase relation existing at that time between the current resulting from the received wave, viz. the reflected wave, and the current corresponding to the oscillations being produced in the oscillator-detector itself. Since the phase relation is continuously changing cyclically, the resultant current will undergo a cyclic change of amplitude thus producing an alternating current of low frequency. The invention will be understood by again referring to the curve shown in Fig. 1a. If the frequency of the transmitting oscillator (which frequency is, of course, determined by the constants of the tuned circuits) is continuously varied over a frequency range several times as wide as the frequency interval required to produce one beat, (viz. the distance between two adjacent minimum points of the curve of Fig. 1a) several beats will be indicated by the meter 28. That indicates that the phase relation between the waves generated by the source 20 and the reflected waves impressed thereon by the antenna 26 will have been shifted through an angle corresponding to several cycles. By making this rate of frequency variation of the transmitting oscillator vary rapid, the number of beats per second, as defined above, is correspondingly increased. For a given height above the ground, the number of beats produced per second is equal to $$\frac{\text{(number of cycles through which oscillator is varied in each sweep)} \times \text{(number of times oscillator is swept across this range in one second)}}{\text{(frequency interval through which oscillator must be varied in order to produce one "beat")}}$$

Similarly, for a given rate of change in the frequency of the transmitting oscillator, the height above the ground will be indicated by the number of beats produced per second. This beat frequency can be determined by means of the frequency indicator, which may be of the vibrating reed type.

The principle involved may be clearly understood by assuming that it is desired to calibrate the arrangement for certain assumed values of altitude and frequency. For example, assume that the craft is at a height of 300 meters above the ground and that the continuously varying condenser is capable of changing the frequency of the oscillator continuously over a range of 2,000,000 cycles at the rate of 100 sweeps, that is, times per second. Let it be assumed, referring to Fig. 1a, that the frequency range between two adjacent, null points of the curve, that is, between $f_1$ and $f_2$, is 500,000 cycles. Accordingly, the meter reading would be $$\frac{2,000,000 \times 100}{500,000} = 400 \text{ beats per second.}$$

If the height of the craft above ground is 3000 meters, the indicator will show a reading of $$\frac{2,000,000 \times 100}{50,000} = 4,000 \text{ beats per second.}$$

By assuming certain altitudes, the scale of the indicator 28 may be marked to read directly in meters instead of in cycles per second and a direct and continuous indication of the altitudes of the craft may be obtained.

In practical operation, it may be convenient to use a transmitting oscillator at a frequency of about 30 megacycles, corresponding to the wave length of 10 meters. The frequency range of 2,000,000 cycles employed in the numerical illustration above would, in this case, correspond to an overall frequency variation of about 6.7%. For higher values of the frequency of the transmitting oscillator, the required percentage change in frequency would be correspondingly smaller.

Fig. 3 illustrates a system which combines the direct indicating feature of Fig. 2 with the use of separate transmitting and receiving antennæ, as shown in Fig. 1. The use of a receiving antenna separate from the transmitting antenna and arranged to be partially balanced with respect to the direct effect of the transmitting antenna possesses the advantage of controlling the ratio of the amplitude of the reflected received waves to the amplitude of the transmitted waves impressed directly upon the receiving antenna by the transmitting antenna by virtue of the unbalance existing between them.

In Fig. 3, in which the same numerals have been used to indicate parts similar to those in the other figures, the oscillator 20' is coupled by the inductance 21 with the transmitting antenna 2, the said inductance forming part of the tuned circuit. The variable condenser 23, which is varied continuously by the motor 24, serves to change cyclically the tuning of the oscillation circuit, as is done by the arrangement in Fig. 2. The waves radiated by antenna 2 will be reflected by the earth's surface and later will be received by the loop antenna 7. Since the loop is only partially balanced with respect to the transmitting antenna 2, a portion of the transmitted waves will be directly received by the said loop. The reflected waves and the "directly received" waves will be impressed by the loop upon the amplifier-detector 29', and the resultant current will be indicated by 12. By controlling the amplitude of the wave received by the loop directly from the transmitting antenna, as, for example, by varying the degree of unbalance between the loop and the said antenna, or by equivalent means, the ratio of the amplitude of the reflected received waves to the amplitude of the waves received by the loop directly from the transmitting antenna may be so adjusted as to insure a satisfactory indication of altitude by the indicator 12.

My invention resides in a method and means for indicating, either continuously or at the will of the operator, the altitude, at any instant, of the aircraft above the earth. The system employed is independent of the actual frequencies radiated from the craft for the purpose of measuring its altitude, being dependent solely upon the difference between the frequencies corresponding to two consecutive, null points of the curve representing the resultant current values arising from beating the reflected waves, as received by the aircraft, together with the waves generated upon the said aircraft.

It is to be understood, of course, that the arrangements shown in the drawing and described hereinbefore are purely schematic and illustrative of the principle involved, and that the invention is capable of embodiment in different forms without departing from the spirit of the invention and the scope of the appended claims.

What is claimed is:

1. A system for determining the altitude of an aircraft above the earth comprising, in combination, an antenna capable of transmitting the generated waves and of receiving the reflected waves, a source of high frequency waves connected with the said antenna, the said source being capable of generating and detecting oscillations, means connected with said source to vary its tuning continuously and uniformly at a known rate and through a known range, and a frequency indicator connected with the said source.

2. A system for determining the altitude of an aircraft above the earth comprising, in combination, an antenna capable of transmitting the generated waves and of receiving the reflected waves, a high frequency oscillator-detector circuit connected with said antenna, adapted to generate waves to be radiated from the antenna and to beat the reflected waves received by said antenna, the said circuit having a tuned feedback circuit containing a tuning element capable of continuous variation to change the frequency of the generated waves uniformly through a known range between minimum and a maximum, and a frequency indicator connected with the output of said oscillator-detector circuit.

3. A system for determining the altitude of an aircraft above the earth comprising, in combination, a source of electromagnetic waves, means to radiate the said waves from the aircraft and to pick up the waves as reflected from the earth's surface and to combine them with oscillations produced by said source and a frequency indicator connected to said source to indicate the frequency of the wave resulting from the beating operation.

LLOYD ESPENSCHIED.